US005974355A

United States Patent [19]

[11] Patent Number: 5,974,355

[45] Date of Patent: Oct. 26, 1999

Matsumoto et al.

[54] AUTOMATIC TIME SERIES PATTERN CREATING METHOD

[75] Inventors: Shunji Matsumoto; Yutaka Miyahara, both of Kawasaki, Japan

[73] Assignee: Fujitsu Limited, Kawasaki, Japan

[21] Appl. No.: 08/829,237

[22] Filed: Mar. 31, 1997

[30] Foreign Application Priority Data

Jul. 26, 1996 [JP] Japan .................................... 8-198180

[51] Int. Cl.[6] ........................................................ G06G 7/78

[52] U.S. Cl. .......................... 701/120; 701/301; 701/117; 702/177; 705/8; 364/474.16; 364/468.01

[58] Field of Search .................................... 701/120, 121, 701/123, 204, 3, 33, 15, 218, 300, 301; 244/182; 340/500, 525, 945; 342/26, 32, 52, 149, 142, 33, 156, 180; 364/400, 474.16, 168.01; 702/177; 705/8

[56] References Cited

U.S. PATENT DOCUMENTS

| | | | |
|---|---|---|---|
| 3,787,665 | 1/1974 | Watson et al. | 701/120 |
| 4,706,198 | 11/1987 | Thurman | 701/120 |
| 5,247,438 | 9/1993 | Subas et al. | 364/400 |
| 5,265,023 | 11/1993 | Sokkappa | 701/120 |
| 5,270,920 | 12/1993 | Pearse et al. | 364/401 |
| 5,428,547 | 6/1995 | Ikeda | 364/474.16 |
| 5,732,384 | 3/1998 | Ellert et al. | 701/120 |

*Primary Examiner*—Jacques H. Louis-Jacques
*Attorney, Agent, or Firm*—Staas & Halsey

[57] ABSTRACT

The present invention relates to the creating of an aircrew flight scheduling pattern as a time series pattern, and aims at facilitating the effective crew flight scheduling pattern creation by applying a genetic algorithm. A plurality of flight strings are created based on link relations among flights regarded as elements for one day which is defined as a first time span. A genetic algorithm is executed for each flight string, and daily crew flight scheduling patterns are created based on the most suitable evaluation value flight strings. For one month which is defined as a second time span, a monthly crew flight scheduling pattern is created based on the most suitable evaluation value daily pattern strings in the same way by regarding the daily crew flight patterns for 30 days as elements.

14 Claims, 15 Drawing Sheets

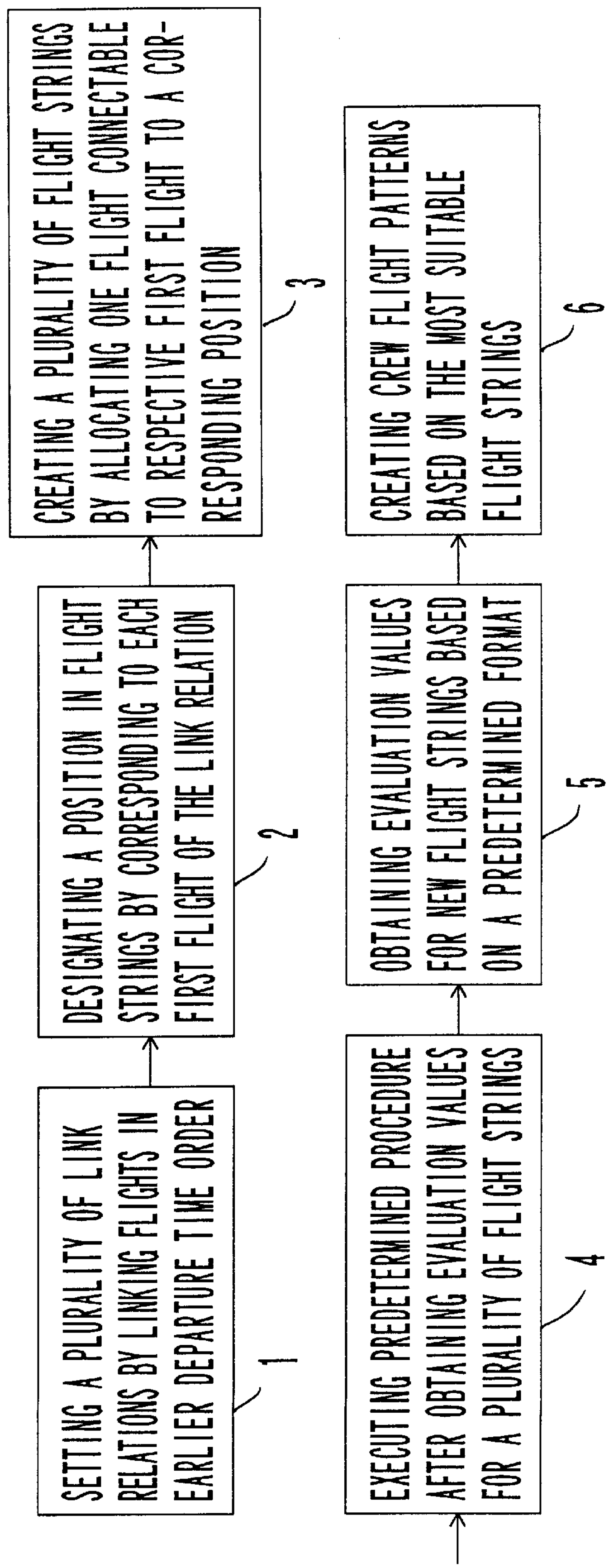
F I G. 2

| | | | | | |
|---|---|---|---|---|---|
| 001 | B767 | TYO | 0640 | SPK | 0810 |
| 002 | B767 | SPK | 0745 | TYO | 0915 |
| | | • | | | |
| | | • | | | |
| | | • | | | |

FIG. 3

| | |
|---|---|
| Number | 001 |
| Type | B767 |
| dep time | 0640 |
| dep port | TYO |
| arr time | 0810 |
| arr port | SPK |

FIG. 4

| | | | | |
|---|---|---|---|---|
| a | TYO | 0640 | 0810 | SPK |
| b | SPK | 0745 | 0915 | TYO |
| c | SPK | 0915 | 1045 | TYO |
| • | | • | | |
| • | | • | | |
| • | | • | | |

| | |
|---|---|
| Sun | WORK STATION |
| Solaris | OPERATING SYSTEM |
| CommonLisp | LANGUAGE PROCESSING SYSTEM |
| KwESHELL | CONSTRUCTION TOOLS INCLUDING A GA ENGINE |
| MAIN, GA1, GA2 | APPLICATION |

FGI. 22

AUTOMATIC TIME SERIES PATTERN CREATING METHOD

BACKGROUND OF THE INVENTION

1. Field of the Invention

This invention relates to a time series pattern creating method for creating a plurality of time series patterns by sequencing a plurality of elements to be arranged in time series. More particularly, this invention relates to a method for automatically creating a crew flight scheduling pattern for a crew flight scheduling string of an aircrew, for example.

2. Description of the Related Art

A prior art is hereinafter explained, which relates to crew flight scheduling pattern creation for an airplane crew. Such art is explained in order to explain a preferred embodiment as an actual example of a crew flight scheduling pattern of an airplane crew, which will be explained later. This invention, however, relates to a time series pattern creating method for creating time series patterns generally by sequencing elements to be arranged in time series.

An aircrew flight scheduling pattern is a successive flight schedule in which the captain of an airplane starts from Haneda Airport, Tokyo, at 6:40, for example, in order to fly the airplane (an airplane number: 001, an airplane type: B767), which arrives at Sapporo Airport at 8:10, then starts from Sapporo Airport at 9:30 using another airplane, leaving for Osaka Airport.

Since operating an airplane is expensive, successive flights are generally fixed in an airplane operation pattern, that is, in a shipping pattern. Therefore, it is necessary to create aircrew scheduling patterns so that the cost can be reduced as much as possible, and for the personnel to work effectively, for example, by the captain changing between airplanes.

Conventionally, this kind of crew scheduling pattern is obtained by creating a crew scheduling pattern for every day, while considering various objective conditions. Such objective conditions include, for example, a condition in which the number of necessary personnel was reduced by decreasing a total number of patterns.

However, there arose a problem in that a crew scheduling pattern which worked effectively as a whole, could not be easily created. That was because the total number of flights often increases, and the objective conditions included not only the total number of patterns, but also various other conditions. Those other conditions included conditions such as to reduce the number of times the captain boards an airplane as a passenger only for a transfer to another airplane at another airport, the removal of a variation of flight hours among the aircrews, and the like.

Further, there was another problem in that it was impossible to create the most effective monthly pattern because the number of flights, as the volume of data, becomes significantly large, and the number of object conditions to be considered also becomes large, when a crew flight scheduling pattern per month, namely, monthly patterns, are created.

SUMMARY OF THE INVENTION

The object of the present invention is to provide a method for automatically creating a crew flight scheduling pattern in which costs can be reduced, and the working efficiency of personnel can be increased, even when a very large number of flights are targeted, and a plurality of object conditions should be considered.

In the automatic time series pattern creating method of the present invention, for a first time span a first time series pattern is obtained based on the contents of an element string with a suitable evaluation value among the element strings which are formed based on the plurality of link relations in which the element having the earliest starting time is linked successively to elements having a starting time later than the end time of the above-mentioned element.

Then, a second time series pattern, for a second time span longer than the first time span, is formed by using the first time series patterns obtained for the first time span, based on the contents of the string with a suitable evaluation value among the first time series pattern strings, which are formed based on normally a plurality of link relations in which each of the first time series patterns having the earliest starting time is linked successively with each of the first time series patterns having the starting time later than the end time the above-mentioned each of the first time series patterns.

In the automatic time series pattern creating method of the present invention, a genetic algorithm is applied to the element strings and first time series pattern strings which are used for creating the first time series patterns in a first time span, and also to the second time series patterns in a second time span. In the processing of this genetic algorithm, a one-point crossover between arbitrary elements in the above element strings or between arbitrary first time series patterns in the above first time series pattern strings, and a mutation which targets element strings or the first time series pattern strings created as the result of the one-point intersection, are executed.

In the case of applying the automatic time series pattern creating method of the present invention to the creation of a crew flight scheduling pattern as an aircrew flight scheduling pattern, a plurality of optimum daily crew scheduling patterns are created as a first time series pattern, regarding one day as a first time span, and regarding all the flights in that day as the above mentioned elements.

Then, after a plurality of the most suitable daily crew flight scheduling patterns for a plurality of aircrews are respectively created for successive plural days, the most suitable crew flight scheduling patterns are further created for the successive plural days based on the string contents with more suitable evaluation values among the first time series pattern strings to be created, according to the link relations in which each of a plurality of daily crew flight scheduling patterns is linked successively for successive plural days as a second time span. By regarding these successive plural days as one month, a crew flight scheduling pattern for one month, namely, a monthly crew flight scheduling pattern, is created.

As explained above, after daily crew flight scheduling patterns of the aircrews for the first time span are created, monthly crew flight scheduling patterns for the second time span are created. A genetic algorithm is used respectively for creating these daily crew flight scheduling patterns and monthly crew flight patterns, and a crew flight scheduling pattern, in which the evaluation value for a plurality of objective conditions is the highest, is created.

BRIEF DESCRIPTION OF THE DRAWINGS

The present invention will be more apparent from the following detailed description in conjunction with the accompanying drawings, in which:

FIG. 2 is a functional block diagram showing the principle of the present invention (No. 2);

FIG. 3 is a diagram showing an example of daily flight data;

FIG. 4 is a table showing an example of flight data of each flight;

FIG. 22 is a chart showing a configuration example of a computer system used for creating crew flight scheduling patterns.

DESCRIPTION OF THE PREFERRED EMBODIMENT

Figure 1:
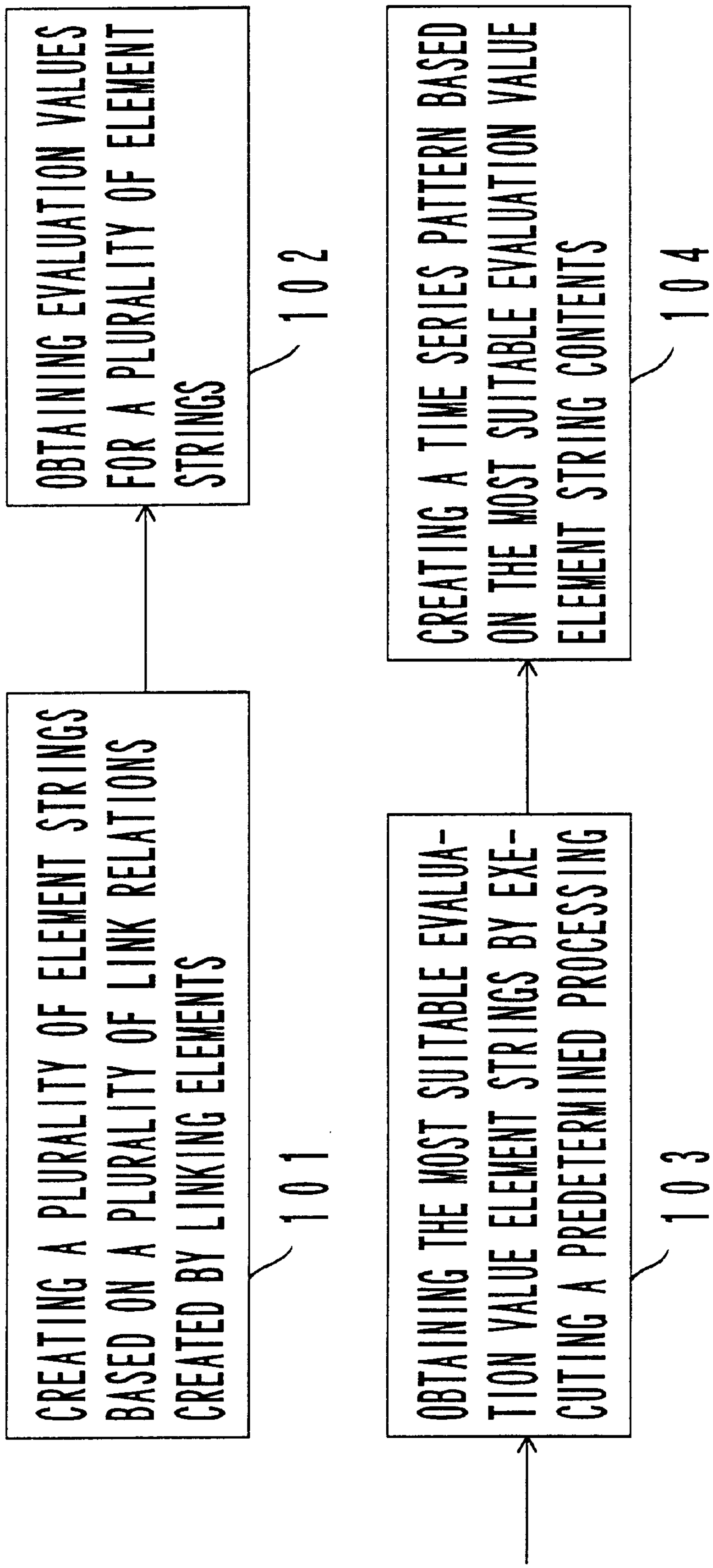
FIG. 1 is a functional block diagram showing the principle of the present invention (No. 1)

FIG. 1 is a functional block diagram showing the principle of the present invention (No. 1). In the preferred embodiment of the present invention, a plurality of time series flight scheduling patterns, namely, daily crew flight scheduling patterns, are created based on all the flights in a day. These crew flight patterns are combined to create a plurality of days of crew scheduling patterns, for example, a monthly crew scheduling pattern. The principle of the present invention is hereinafter explained based on the condition that one day is defined as a first time span, and a plurality of days, for example, one month, are defined as a second time span.

At first, the processing shown in FIG. 1 is executed by targeting the first time span. A plurality of element strings are created based on a plurality of link relations. The link relations are created by successively linking the element with the earliest start time among the elements to be arranged in time series as shown by block 101 in FIG. 1, to another element with a starting time later than the end time of the above-mentioned element.

Next, an evaluation value is obtained for each element string based on a predetermined format, as shown by block 102 in FIG. 1. The evaluation value is obtained by a predetermined processing for each element string, for example, a genetic algorithm processing is executed, as shown by block 103. Then, an element string having the most suitable evaluation value is obtained corresponding to the result.

Lastly, a plurality of time series patterns are created based on the contents of the element string having the most suitable evaluation value, as shown by block 104 in FIG. 1. The time series pattern created by the above-mentioned processing becomes a daily crew flight scheduling pattern when a first time span represents one day, and plural elements represent all flights in a day.

For the second time span, the processing as shown by blocks 101 through 104 of FIG. 1 is executed while the time series pattern obtained for the first time span, for example, a daily crew flight scheduling pattern, is regarded as an element. First, at block 101, a time series pattern string is created as a plurality of element strings based on a plurality of link relations created by successively linking a time series pattern having the earliest start time among the time series patterns obtained for the first time span, to time series patterns having early starting times.

Then, the processing as shown by blocks 102 and 103 is executed by regarding time series patterns as elements. Finally a plurality of time series patterns corresponding to the second time span are created based on the contents of the time series pattern strings regarded as the most suitable evaluation value element strings. A time series pattern for the first time span is a daily crew flight scheduling pattern, and a time series pattern for the second time span is a monthly crew flight scheduling pattern, when the second time span is one month.

FIG. 2 is a functional block diagram (No. 2) showing in further detail the principle of the present invention by corresponding to the preferred embodiment of the present invention. FIG. 2 is a principle functional block diagram of an automatic crew flight scheduling pattern creating method for creating aircrew flight patterns to be used as a plurality of time series flight scheduling patterns by putting a plurality of flights in order.

At block 1 in FIG. 2, a plurality of link relations are set while a plurality of link relations allow flights to be duplicated among different link relations, by successively linking the flight departing at the earliest departure time among a plurality of flights to another flight departing later than the arrival time of the above-mentioned flight, which is determined to be connectable to the above-mentioned flight.

Next, as shown by block 2 in FIG. 2, a position in flight strings, in which flights should be arranged by corresponding to each flight which is located at the beginning of a plurality of link relations, is designated. As shown by block 3, one flight is selected from one or more flights connectable to the flight which is located at the beginning of the flight string, then the thus-selected flight is arranged in the above-mentioned corresponding position, and finally a plurality of flight strings are created.

After an evaluation value is obtained according to a predetermined format, for a plurality of flight strings as shown by block 4, a predetermined processing, for example, a genetic algorithm processing, is executed. At block 5, an evaluation value is obtained for new flight strings from the results of the above processing according to a predetermined format, that is, a format reflecting a requested condition such as minimizing the total number of patterns. As shown by block 6, a plurality of the most suitable crew flight scheduling patterns are created corresponding to a plurality of crews, based on the contents of a flight string having the most suitable evaluation according to the evaluation value.

The principle method as shown in the functional block diagram of FIG. 2, is applied to the creating of a crew flight scheduling pattern per day, namely, a daily pattern. Namely, the aforementioned plural flights are all the flights for the whole country per day. A processing for setting link relations among flights while targeting all the flights, is executed at block 1 in FIG. 2. Then, a plurality of crew flight scheduling patterns are created while targeting all the flights of the whole country by executing the processing as shown by blocks 2 thorough 6, and effective crew flight scheduling patterns can be created by respectively assigning these crew flight scheduling patterns to a plurality of crews.

In this case, however, the case where a same flight is duplicated may occur in different crew flight scheduling patterns is inconvenient. Because of this the duplication of flights is checked so that the same flights are not included in each of plural flight strings created as shown by block 3 in FIG. 2, and in the new flight strings as the result of the predetermined processing executed as shown by block 4.

The predetermined processing to be executed at block 4 in FIG. 2 is a processing according to, for example, a genetic algorithm as explained before. In this processing, for example, a crossover processing or a mutation processing is used. Then, the calculation method for the evaluation value for each flight string obtained at blocks 4 and 5 is determined in a way that the total number of the patterns, and the number of times of exchanging flight equipment such as the number of times of a captain changing between airplanes, and the number of times the captain boards as a passenger only for a transfer to another airplane, for example, should each be minimized.

When a monthly pattern for a month is created from a daily pattern created for each day, the same method as shown in FIG. 2 is basically used. In FIG. 2, flight strings are created based on the link relations which are set for a plurality of flights, and a daily crew flight scheduling pattern is created by corresponding it to the contents of the most suitable flight string. However, at the time of creating a monthly pattern, a crew flight scheduling pattern per day, that is a daily pattern, is used instead of the flight as shown in FIG. 2, and a processing is executed. Namely, for example, after a daily pattern for one day is created, the same processing as shown in FIG. 2 is executed by targeting the daily patterns for one month (30 days), for example.

Link relations are set among the daily patterns as shown by block 1 in FIG. 2. Then a position in the daily pattern strings is designated as shown by block 2, a plurality of daily pattern strings are created as shown by block 3, and a predetermined processing is executed as shown by block 4, an evaluation value is obtained as shown by block 5. Finally a monthly crew flight scheduling pattern is created for 30 days based on the contents of the daily pattern strings with the most suitable evaluation values, as shown by block 6.

As described above, according to the present invention, a genetic algorithm, for example, is used for creating a daily crew flight scheduling pattern and a monthly crew flight scheduling pattern. A crew flight scheduling pattern which obtains the highest evaluation according to the various objective items is created.

The preferred embodiment of the present invention will be explained in detail, referring to the creation of an aircrew scheduling pattern as a concrete example. In the explanation, the preferred embodiment is explained by separating the daily pattern created as a crew flight scheduling pattern per day, from the monthly pattern created as a crew flight scheduling pattern for a month, which is the result of combining the daily scheduling patterns.

FIG. 3 is an example of daily flight data, namely, a diagram showing a schedule of flights. In FIG. 3, flight data are shown such that an airplane (airplane number: 001, airplane type: B767) departs from Tokyo (TYO) at 6:40 a.m., and arrives at Sapporo (SPK) at 8:10 a.m. Further, data are shown such that an airplane (airplane number: 002, airplane type: B767) departs from Sapporo at 7:45 a.m., and arrives at Tokyo at 9:15 a.m.

FIG. 4 is a diagram showing flight data in which data of an airplane number, airplane type, departure time, departure airport, arriving time, and arriving airport, are represented as a set of data corresponding to each flight, from the diagram shown in FIG. 3. In FIG. 4, flight data corresponding to the flight shown in the first line of FIG. 3 are represented.

Figures 5, 7:
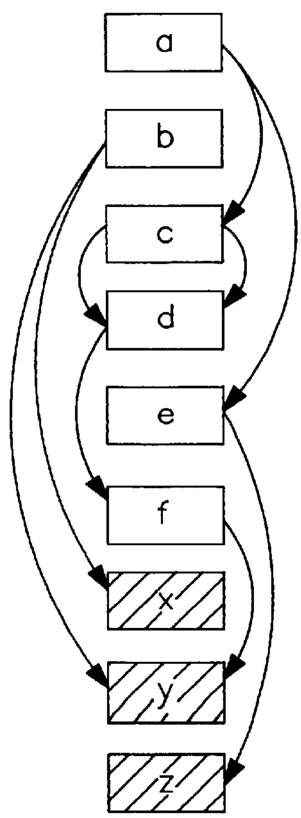
FIG. 5 is a table showing an example of flight objects which are arranged in earlier departure time order.
FIG. 7 illustrates an example for link setting for a plurality of flight objects.

In the preferred embodiment of the present invention, a flight object corresponding to each flight is created from the diagram data shown in FIG. 3 or the flight data as shown in FIG. 4. All the flight objects for one day are put in order from the flight of the earlier departure times, as shown in FIG. 5. In FIG. 5, the first flight object is the object represented in the first data line shown in FIG. 3, and is named a flight object a for the following explanation. Further, the next flight object is the object represented in the second data line shown in FIG. 3, and is named a flight object b. In the same way, the flight objects corresponding to the flights of the whole country are put in order from the flight which starts earlier.

Figure 6:
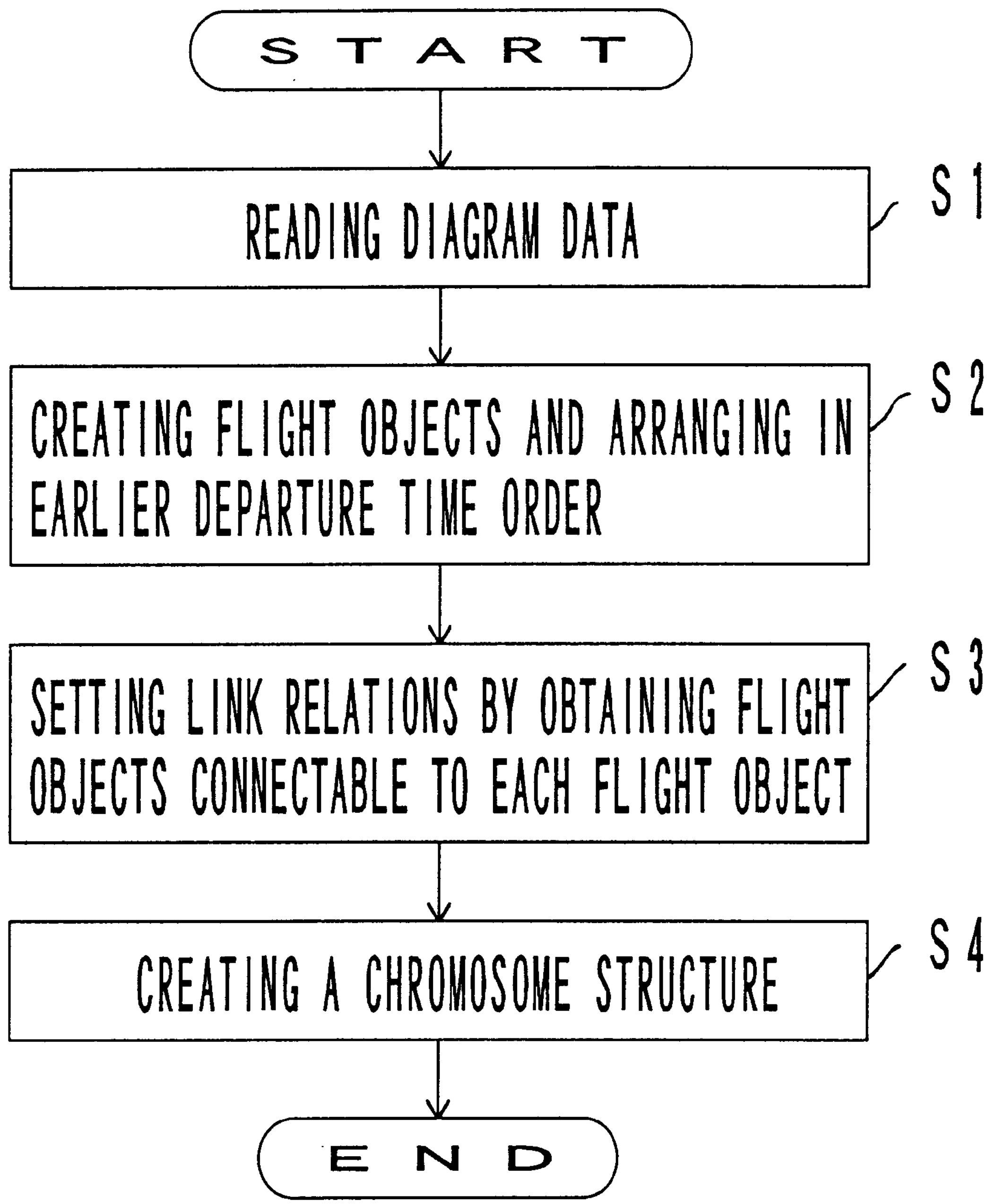
FIG. 6 is a flowchart showing the pre-processing for creating a daily pattern.

The processing for creating the flight object and the list as shown in FIG. 5 is a part of a daily aircrew flight scheduling pattern creation processing for a pilot and the like in the present invention. FIG. 6 is a flowchart of a pre-processing for a daily pattern creation algorithm. In FIG. 6, when a processing starts, data as shown in FIG. 3 is read in step S1, then the flight objects as explained in FIG. 5 are created, and all the flight objects corresponding to the flights of a whole country are put in earlier departure time order in step S2.

Next, in step S3, each flight object, namely, each one of the flight objects a, b, . . . as shown in FIG. 5, is examined to determine whether or not there exist connectable flight objects as successive flights. Then, a link is established among the connectable flights. The conditions required for a connectable successive flight object are that the airport is the same and the following equation is satisfied regarding time:

next flight departure time≧current flight arriving time+minimum stay time, where the minimum stay time means a necessary time for maintenance and the like.

FIG. 7 illustrates an example for link relations which are formed in step S3 for each flight object as explained in FIG. 5. In FIG. 7, the link relations are set with flight object a having the earliest departure time defined as the leading object. For example, two link relations a-c-d and a-e-z are set. Then, the link relations are set with flight object b as the leading object. For example, two link relations b-x and b-y are set, and so forth. A flight object having no subsequent objects, that is, no connectable objects, for example, x is hatched in FIG. 7.

In the preferred embodiment, a genetic algorithm (GA) is applied to a processing for creating aircrew scheduling patterns. The structure of a chromosome according to the GA is created in the final step of the pre-processing algorithm shown in FIG. 6, namely, in step S4. This chromosome is an element string used for creating the aircrew scheduling patterns in the preferred embodiment. The chromosome is structured as follows. That is, the flight object having subsequent flight objects shown in FIG. 7 is assigned to each gene coordinate indicating the position of each gene forming part of a chromosome. The assigned flight object has subsequent flight objects in the link relations among the flight objects shown in FIG. 7 (unhatched objects), that is, 6 flight objects a~f.

Figure 8:
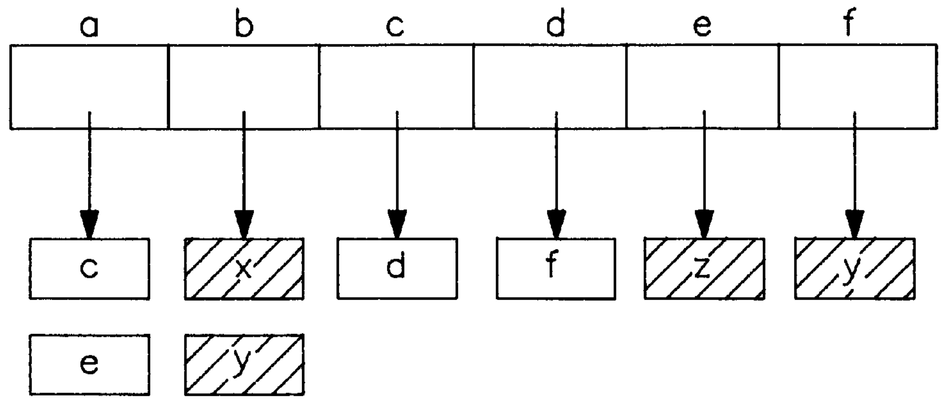
FIG. 8 is a diagram showing an example of the structure of a chromosome.

FIG. 8 illustrates the structure of the chromosome created in the step S4 of FIG. 6. Here, the flight objects a through f which have successive flights are allocated in the loci in a left-to-right order. As will be explained later, the flight objects which are successive flights of the flight objects, each of which corresponds to a respective locus, are selected at random to be genes. Namely, the chromosome used in the aircrew scheduling pattern creation processing is a flight string (element string) in which only one flight which is selected among successive flights of the first flight in the link relations among flight objects, is arranged.

Here, each locus is allocated to a flight object in an upper side of the drawing as shown in FIG. 7, in the left-to-right order, namely, from the flight object departing at the earlier departure time. However, it may be convenient to allocate in the left-to-right order beginning from the flight object having the smallest number of connectable successive flights, for removing any restriction condition violation. This situation will be explained with reference to FIG. 14.

Figure 9:
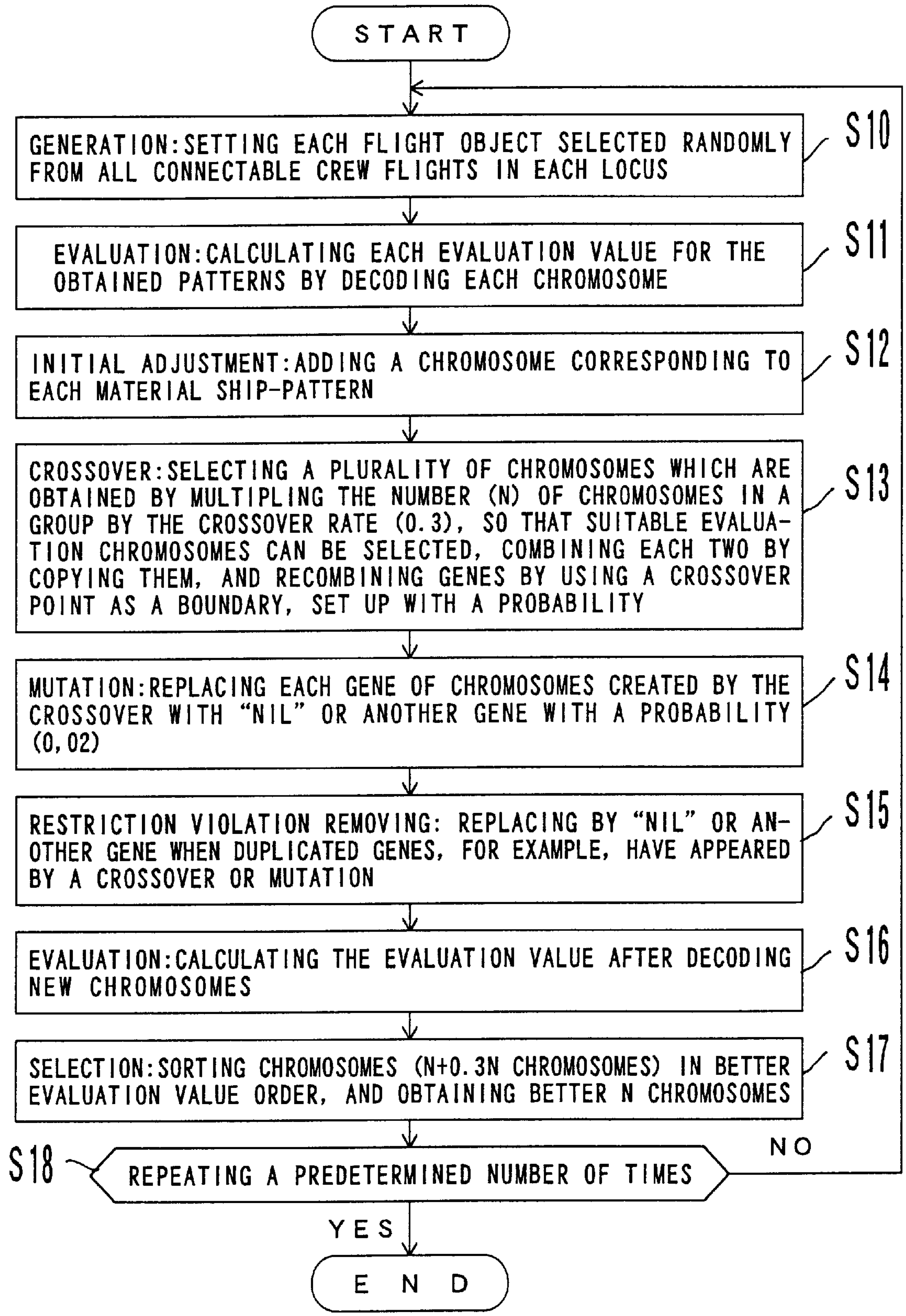
FIG. 9 is a flowchart showing the main-processing for creating a daily pattern.

FIG. 9 is a flowchart showing the main-processing of a daily pattern creation algorithm. FIG. 9 illustrates the processing which is executed successively after step S4 as shown in FIG. 6. In FIG. 9, when a processing starts, a processing for creating a chromosome is performed in step S10. In this chromosome creating process, a flight object is set as a gene at each coordinate of the chromosome. The gene is selected at random from among flight objects connectable to the flight objects assigned to each gene coordinate described by referring to FIG. 8, that is, normally plural subsequent flight objects.

Figure 10:
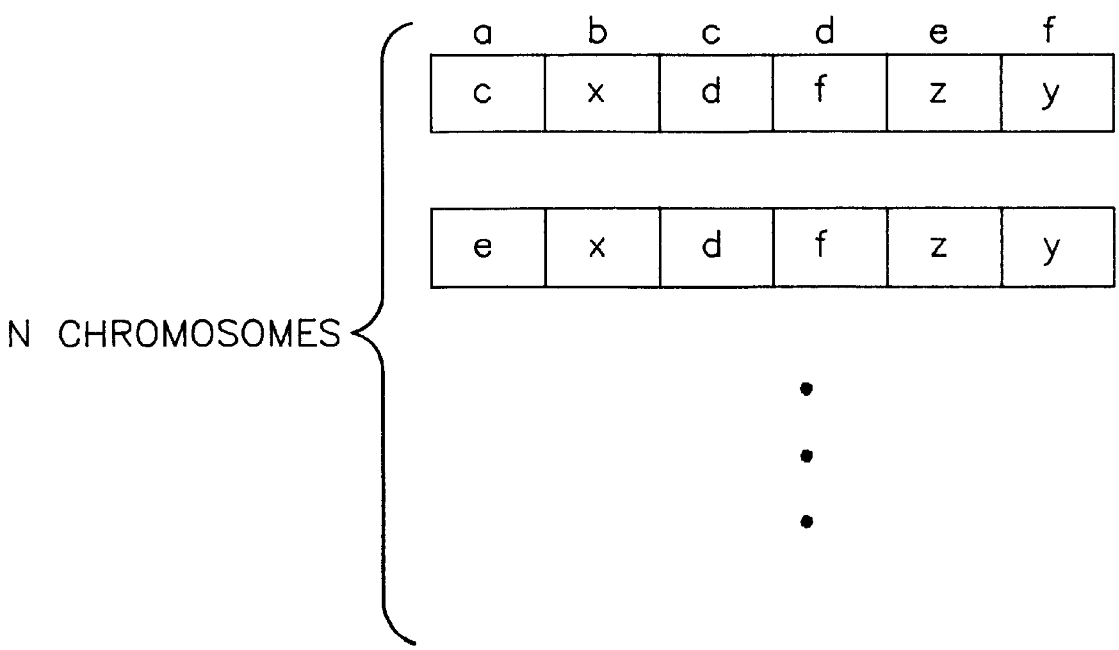
FIG. 10 is a diagram explaining chromosome creation by setting genes.

As for the chromosomes, the number N, for example, 20 chromosomes are created. FIG. 10 illustrates an example of chromosomes created in this way. However, the successive flights are set in a way that the gene inside each chromosome should not be duplicated, namely, the same flight object should not be duplicated in the same chromosome.

Next, the evaluation processing for each chromosome is executed in step S11. In this evaluation processing, each chromosome is decoded, then a crew flight scheduling pattern is created, and each chromosome evaluation value is calculated for the total number of crew flight patterns, and the number of times of exchanging flight equipment or the number of times of the captain changing airplanes, for example.

Figure 11:
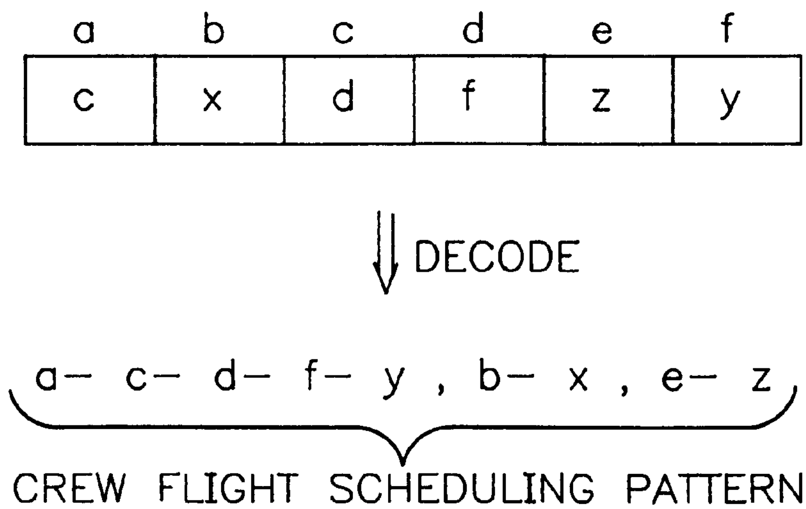
FIG. 11 is a diagram explaining a crew flight scheduling pattern decoding according to the chromosome.

FIG. 11 illustrates a chromosome's decoding and evaluation value calculation. In FIG. 11, an aircrew daily scheduling pattern is created for a pilot, etc. as a sequence of flight objects according to the arrangement at the genes in the chromosome by decoding the chromosome. As this crew flight scheduling pattern, patterns in which the flight object a is sequentially followed by c, d, f, and y, the flight object b is followed by x, and the flight object e is followed by z, are created based on the contents of the chromosome genes.

The airplane number to be used for successive flight objects such as b and x can be obtained according to each crew flight scheduling pattern, from the data as shown in FIG. 3, or the flight data as shown in FIG. 4. Therefore, it is recognized whether or not it is necessary to change airplanes, that is, to change airplanes for the next flight of the pilot, and, if yes, how many times the changes will be performed.

For each chromosome, the total number of crew flight scheduling patterns which are created based on the result of the decoding and the total number of necessary material exchanges are obtained. For example, the evaluation value is calculated by the following equation, using the weight 100 for the total pattern number and the weight 10 for exchanging the flight equipment, for example:

evaluation value=(total pattern number×100)+(material exchange number×10)

When the total number of decoded patterns from one chromosome is 30 and the total number of necessary material exchanges is 10, the evaluation value for the chromosome becomes 3100. Thus, the evaluation value is calculated for the number N, for example, 20 chromosomes.

After the evaluation value calculation is finished in step S11 as shown in FIG. 9, then the initial adjustment processing is executed in step S12. In this processing, another chromosome is created in addition to the N chromosomes for which the creation processing is executed in step S10, and then added to the chromosomes which are created in step S10. The chromosome to be added here corresponds to a shipping pattern for each airplane. The shipping pattern means a pattern representing how one airplane is successively used for other flights within the same day. This pattern corresponds to the airplane data as shown in FIG. 12, for example.

Figure 12:
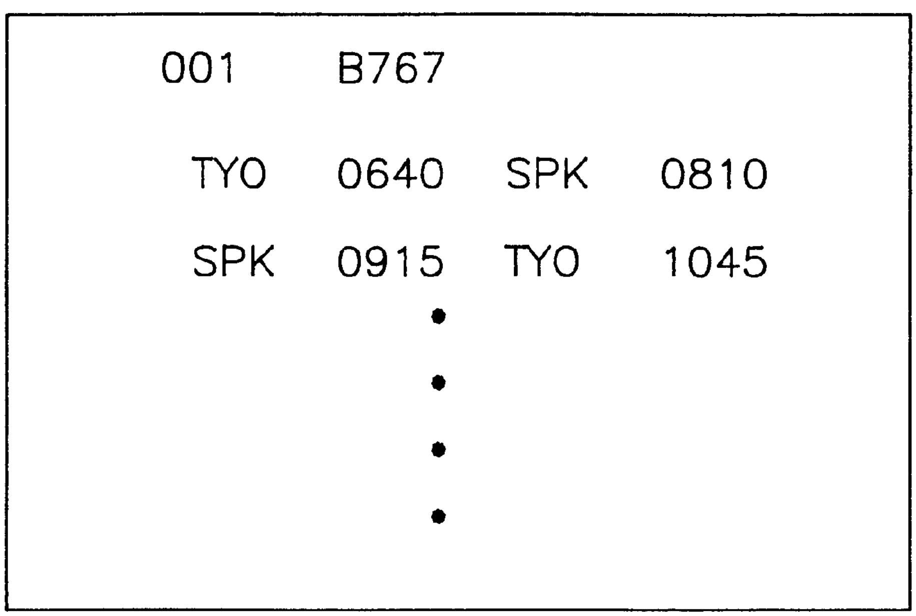
FIG. 12 is a diagram showing an example of airplane data, corresponding to a shipping pattern.

FIG. 12 illustrates that the airplane (airplane number: 001, airplane type: B767) is successively used in the flight object order such as the a, c, . . . order. The corresponding crew flight scheduling pattern chromosome is created from the airplane data as shown in FIG. 12, and added to the chromosomes created in step S10. The evaluation value becomes more suitable because the crew flight scheduling pattern, which is decoded based on the chromosome corresponding to this shipping pattern, does not require a material exchange. The crew flight scheduling pattern which does not require a plurality of material exchanges is obtained at an earlier stage by adding the chromosome having a more suitable evaluation value in step S12.

Next, the crossover processing and mutation processing for the GA processing are executed in steps S13 and S14 respectively. Here, a one-point crossover is used for the crossover. At the one-point crossover, the chromosomes, that is, the total number of units, is multiplied by a crossover ratio, for example, 0.3. The resultant number of the chromosomes are selected. For example, if there exist chromosomes corresponding to the shipping pattern of each airplane, N, for example, 20 is multiplied by 0.3 and the product of 6 chromosomes are selected. The selection is designed such that a better (smaller) evaluation value can be selected. The selected units are copied and combined in twos, and the gene is exchanged at the crossover point defined based on the probability among the combined units.

Figure 13:
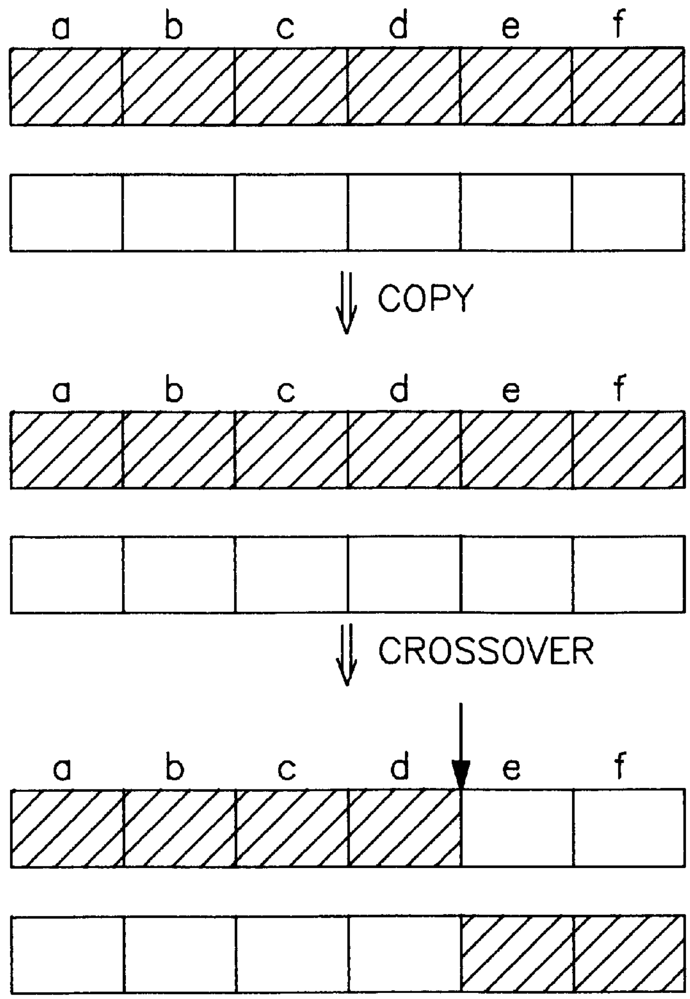
FIG. 13 is a diagram showing an example of crossover.

FIG. 13 illustrates the crossover processing. In FIG. 13, two chromosomes, among plural chromosomes which have smaller evaluation values, are selected to be the set of chromosomes, they are copied, and a one-point crossover process is made. As for the crossover point for the one-point crossover, the boundary between the loci corresponding to the flight objects d and e is selected, the gene which exists at right side of the boundary, for example, is exchanged in a set of chromosomes, and finally two new chromosomes are created.

As the method for selecting the most suitable evaluation value in crossover processing, roulette selection, for example, is used. This roulette selection is a method, as a basic principle, for allocating a wide area to more suitable evaluation value chromosomes on a roulette board, and spinning the roulette wheel, thereby randomly selecting chromosomes.

After the crossover processing is executed and a new chromosome is created in step S13, a mutation processing is executed for targeting this created chromosome in step S14. In this processing, an exchanging processing, in which each gene of the newly created chromosomes is exchanged with another gene or nil (not connected), with a probability of about 0.02, for example, is executed. Namely, another successive flight or nil, which shows that no successive flight exists, is selected from a plurality of successive flights of the flight objects, each of which corresponds to each locus as explained in FIG. 8. Here, nil can be set as the gene corresponding to each locus, when the initial N chromosomes are created as shown in FIG. 10.

After the GA processing is executed in steps S13 and S14, the restriction condition violation removing processing is executed in step S15. Various kinds of restriction conditions (for example, the case where the number of crew flights exceeds five, is the excessive crew flight condition violation) are applied in step S15. For example, a removing processing is executed in order to remove the duplication violation of flight objects, that is, the restriction condition violation in which the same flight objects are duplicated in one chromosome as a gene. Namely, when the same gene exists in one chromosome by the mutation or crossover, the processing for exchanging this gene with another gene or nil is executed.

Further, although all flights should be included in the decoded results for each chromosome, there is a case where all flights might not be included due to the gene processing. For this kind of chromosome, the removing processing is executed in order to correct the above situation.

Figure 14:
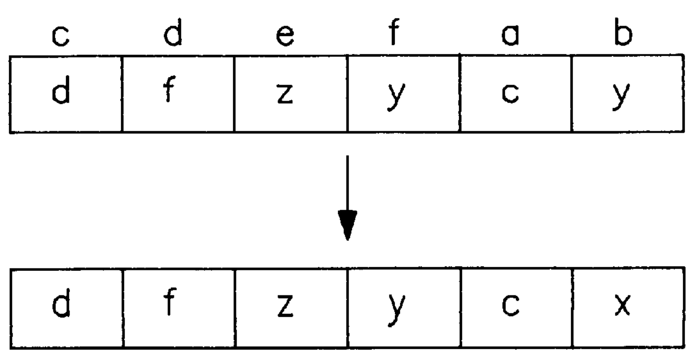
FIG. 14 is a diagram showing an example of removing a duplication violation (No. 1)
Figure 15:
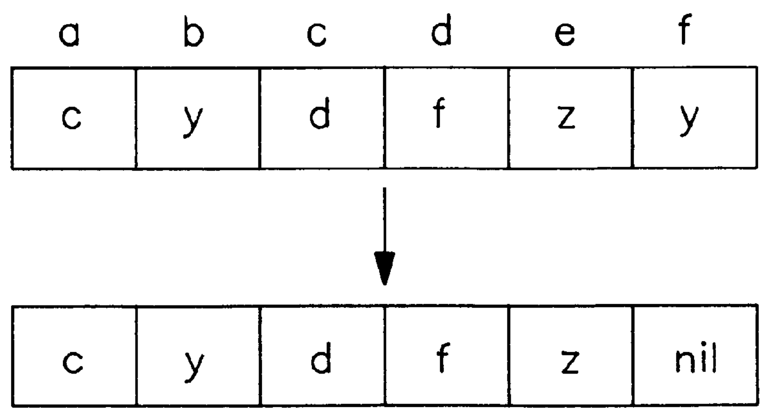
FIG. 15 is a diagram showing an example of removing a duplication violation (No. 2)

FIGS. 14 and 15 illustrate this restriction condition violation removing processing. In FIG. 14, the flight objects are allocated in the smaller number of successive flights order, beginning from the left-hand side of the locus of the chromosome, different from the others as show in FIGS. 8 and 10. Namely, the flight objects a and b have respectively three successive flights, while the flight objects c, d, e, and f have respectively two successive flights including nil.

In step S15, in order to investigate the duplicated flight objects, it is determined whether or not the duplicated genes exist by checking each gene in each locus from the left-hand side of the chromosome. The duplication of the gene y is found at the position of the last locus, that is, the position of a locus corresponding to the flight object b as shown in FIG. 14. The duplicated genes are removed by exchanging this gene y with another successive flight among the successive flights of the flight object b, namely, x.

On the contrary, FIG. 15 illustrates the result of the restriction condition violation removing processing corresponding to the chromosome structure as shown in FIGS. 8 and 10. Here, by inspecting each gene from the left-hand side of the chromosome, the duplication of the gene y corresponding to the last flight object f, is found. However, the gene y has no choice but to be changed to nil, because the flight object f does not have a successive flight, other than the successive flight y. Because of this, the flight f becomes the last flight of one daily pattern, so the pattern length, namely, the number of flights included in one pattern, becomes short, although the gene y follows the flight object f as a successive flight as shown in FIG. 14.

Because the total number of necessary flights per day has already been settled, the decrease in the number of flights for one pattern makes the total number of daily patterns increase. Therefore, because a lot of pilots are required, the weight for the total number of patterns becomes heavy in the aforementioned evaluation value calculation. Thus, in order to lessen the number of patterns, it is reasonable that the genes with the smaller number of successive flights are allocated to the left-hand side of the chromosome as shown in FIG. 14. Further, not shown in the figures, the crew connection condition violation can be removed by referring to the flight data of the following day. For example, in the case where the number of flights departing from Sapporo on the following day is two, the pilots cannot be allocated for the following day when they did not finish their flights as Sapporo on that day. Thus, this type of crew connection condition violation should be found and removed.

After the restriction condition violation removing processing is executed in step S15 of FIG. 9, the new chromosome created in steps S13 thorough S15 is decoded in step S16, then a crew flight scheduling pattern is created, and the evaluation value is calculated. Next, in step S17, all chromosomes, for example, N+0.3N=26 chromosomes, are sorted in the more suitable evaluation value order, and the selection processing is executed in order to obtain the top N chromosomes.

Next, in step S18, it is determined whether or not the processing is executed for a predetermined number of times, if not, the processing for the steps S10 through S17 as a main-processing is repeated, with targeting of the next generation of chromosomes, and the processing for creating the daily patterns is finished when it is determined that the predetermined number of processings is finished. For this predetermined number, the number of sufficient times is determined by investigating the convergence condition of an evaluation value for some examples.

After all processing as shown in FIG. 9 is finished, an after-processing, not shown in this figure, is executed. In this after-processing, the most suitable evaluation value chromosome is extracted, among the finally surviving chromosomes. The crew flight scheduling patterns, namely, the daily patterns, for a plurality of pilots for one day, are created by decoding the contents of the thus-extracted chromosome.

In the above description, the processing for creating one day crew flight scheduling pattern for the pilot and the like, namely, the daily pattern, is explained in detail. A crew flight scheduling pattern for one month, for example, a monthly pattern, is created by creating daily patterns for one month corresponding to each day and combining them. This monthly pattern creation processing is explained hereinafter.

Figure 16:
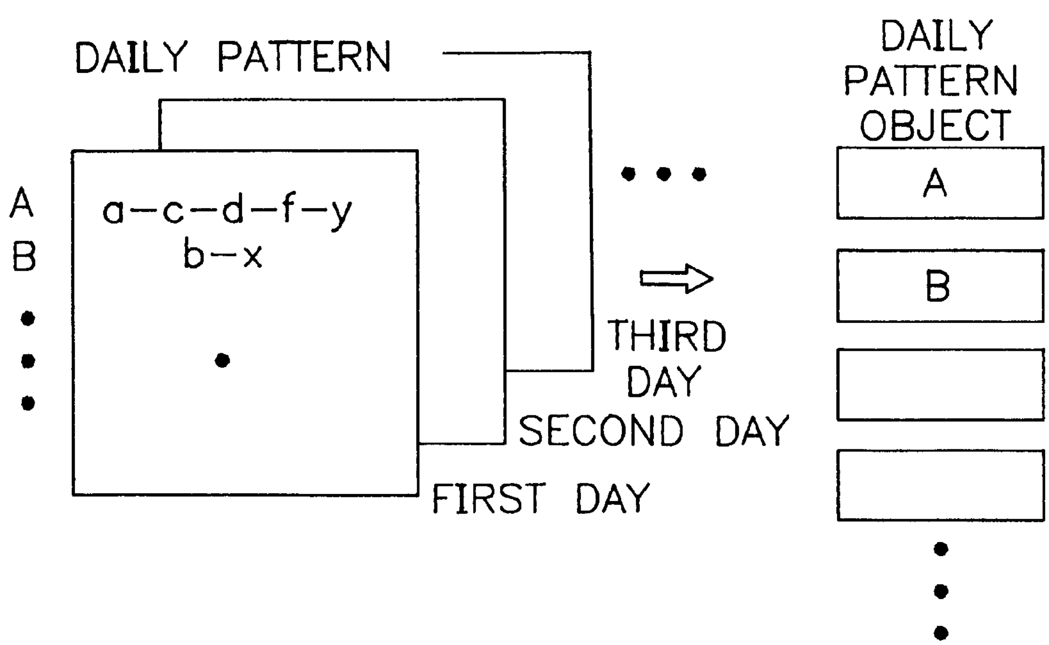
FIG. 16 is a diagram explaining the creation of a daily pattern object based on a daily pattern for one month.

FIG. 16 illustrates daily pattern object creation processing for creating a daily pattern object (arranged in the earlier departure time order) based on a daily pattern. In this figure, daily pattern objects are created by targeting the daily crew flight scheduling patterns for all pilots from the 1st day through the 30th day.

In this preferred embodiment, capital letters A, B, . . . are used to represent the daily pattern objects, since a respective proper noun is given to identify a daily pattern object. As explained in FIG. 11, if the flight objects a, c, d, f, and y, for example, form one daily crew flight scheduling pattern in that order, and b and x form one crew flight scheduling pattern in that order, the names of the daily pattern objects A, B are given to the above-mentioned daily patterns respectively. Then, the daily crew flight scheduling pattern objects from the 1st day through to the 30th day in a month are arranged in the earlier departure time order for the first flight in the daily flight objects, a, b, . . . in the same way as shown in FIG. 5.

Figure 17:
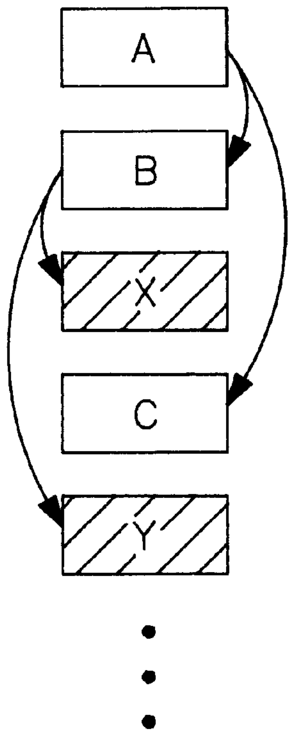
FIG. 17 is a diagram explaining the setting of a link relations for daily pattern objects.

FIG. 17 illustrates link relations for the daily pattern objects arranged in the above-mentioned order. The method for setting these link relations is the same as that shown in FIG. 7, but the daily pattern objects which are linked to are limited to the objects which start on the following day or on the same day for the daily pattern object from which the link starts. For example, in the case where the last arrival airport of the daily pattern object A is the same as the departure airport of the daily pattern object B starting on the same day or on the following day, and the time relation exists as in the following expression, the link relation where B follows after A is set as follows.

Initial flight departure time of B>Last flight arrival time of A+Interval

Here, the interval is not fixed, and it depends on whether the daily pattern B starts on the same day as A or on the following day. For example, when B starts on the following day, the interval is set in order for the pilots to be able to have enough hours of sleep and enough rest time. Here, the airplanes are operated effectively by setting a starting day for the next daily pattern on the same day as the previous daily pattern. Further, in the case where the arrival airport of the last flight y on the first day is different from the starting airport of the initial flight b on the second day, flights will be combined, in such a way that the crew will board on a different airplane as passengers on the second day morning, and then move to the starting airport of b.

Figure 18:
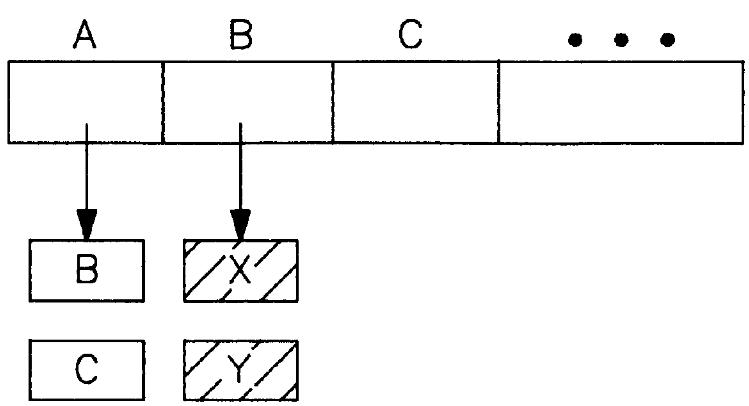
FIG. 18 is a diagram explaining a chromosome structure when processing monthly pattern creation.

The following monthly crew flight scheduling pattern creation processing is executed in the same way, by only replacing the flight objects for the daily pattern creation processing with the daily pattern objects. FIG. 18 illustrates the chromosome structure. In the loci of the chromosome, all daily patterns, except for the daily patterns, for example, X, and Y, of the last position of the link as shown in FIG. 17, are allocated.

Here, each of the daily patterns from the upper position of FIG. 17 corresponds to each of the loci in the left-to-right order. However, it is also possible that the daily patterns are put in the left-to-right order starting from a daily pattern having the least successive daily patterns connected, as explained in FIG. 14. Then, according to this chromosome structure, a daily pattern which can be successive to the daily pattern corresponding to the loci, is selected.

Figure 19:
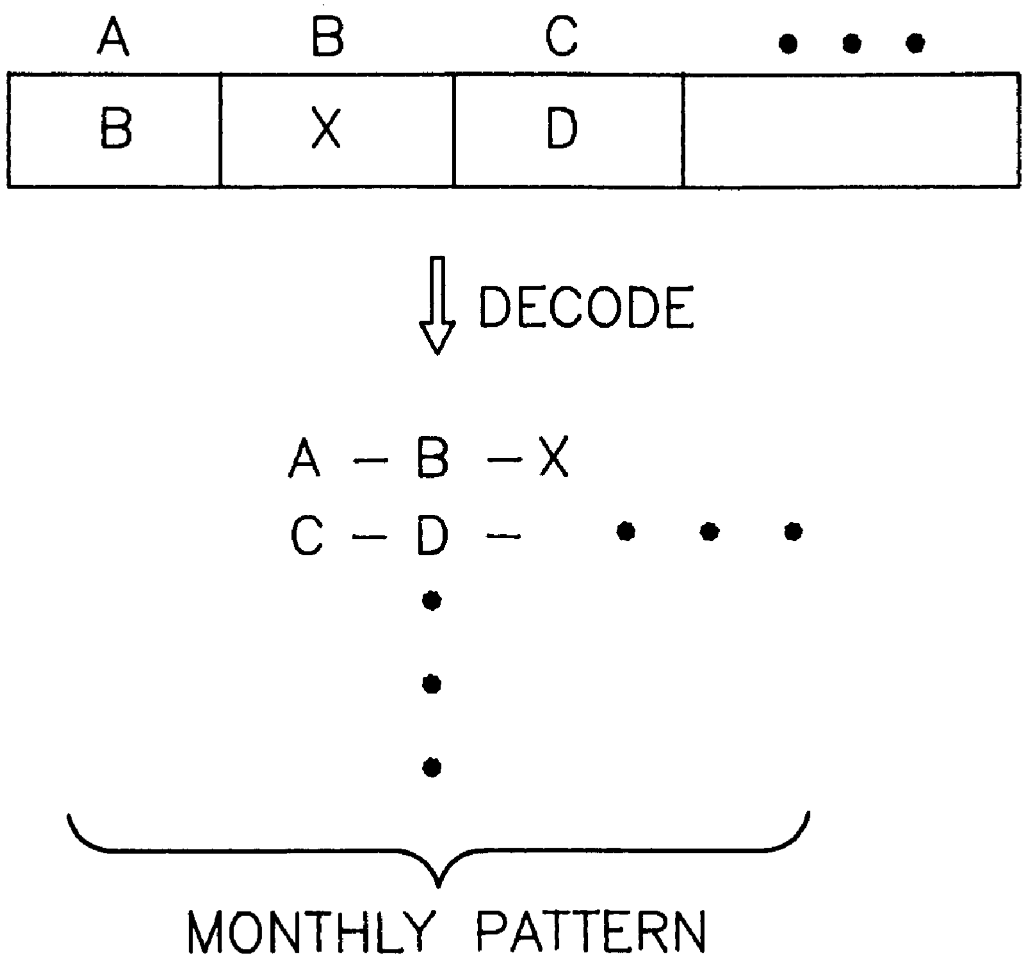
FIG. 19 is a diagram explaining the creation of a monthly pattern which can be obtained by decoding a chromosome.

FIG. 19 illustrates a monthly crew flight scheduling pattern which can be obtained by decoding the chromosome in which the thus-selected genes are arranged. In this figure, a crew flight pattern for one pilot for three days, for example, is created by combining the patterns A-B-X among the daily patterns for one month.

By executing the above-mentioned processing for each daily pattern for one month, a monthly pattern made from successive daily patterns is created. Here, as will be explained later, in the case where the successive crew flight days for one pilot exceed four days, the working of the successive daily patterns should come to an end in four days.

Figure 20:
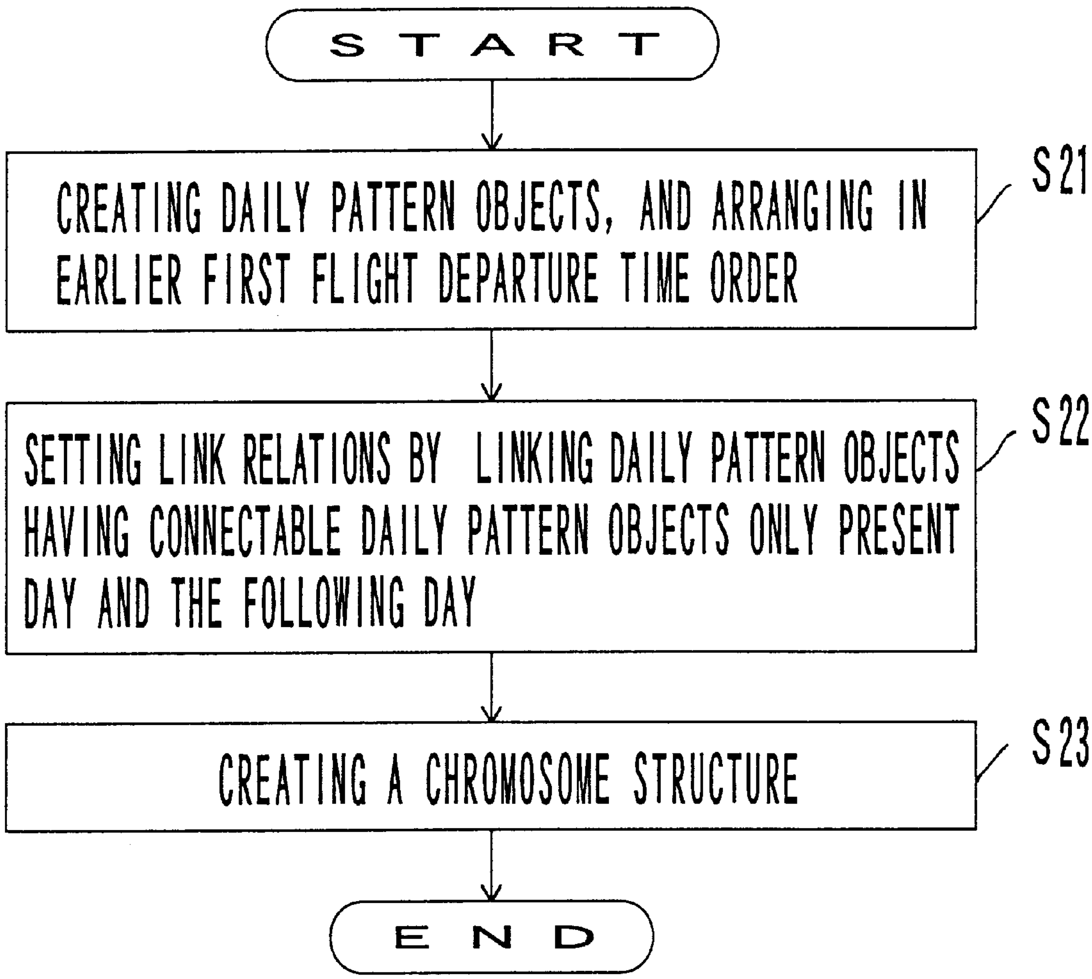
FIG. 20 is a flowchart showing a pre-processing for a monthly pattern creation.

FIG. 20 is a flowchart of the pre-processing in the monthly crew flight scheduling pattern creation processing. When FIG. 20 is compared with FIG. 6 for a daily pattern creation processing, the processing for reading the data as shown in step S1 is not included. The daily pattern objects are created and put in the earlier departure time order in step S21, then the link relations are set among the daily pattern objects in step S22, and a chromosome structure is created in step S23, and then the pre-processing is finished.

Figure 21:
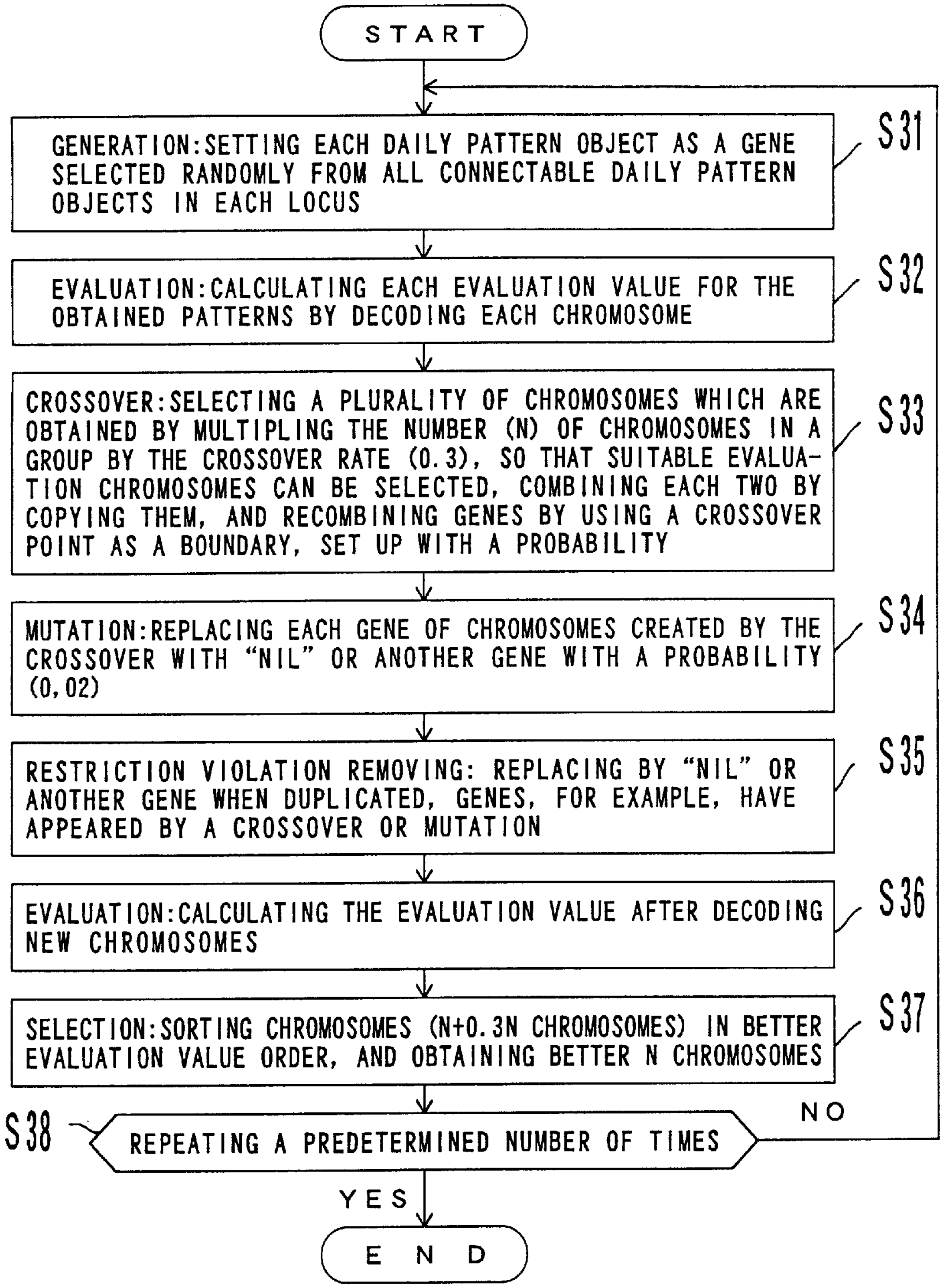
FIG. 21 is a flowchart showing a main-processing for creating a monthly pattern.

FIG. 21 is a flowchart of a main-processing for creating a monthly pattern. When FIG. 21 is compared with FIG. 9 which corresponds to a daily pattern creation processing, the same processings as shown in FIG. 9 are executed, except for a processing for an initial adjustment corresponding to the step S12. However, two types of evaluation items, such as the total number of monthly patterns for each chromosome and the number of base return violations, are used in the evaluation processing in step S32. Since only Tokyo and Osaka, for example, are defined as the bases being the most suitable serving places for the pilots, the number of base return violations means the total number of patterns in which the pilots do not finally return to these bases. For these two items, the evaluation value is calculated by setting the weight for the total number of patterns to 100 and the weight for the base return violations to 30.

For the restriction condition for removing the violation in step S35, a processing for removing the duplicated daily pattern objects is executed. Further, the processing, in which a gene corresponding to the last daily pattern for the fourth day is set as nil (not connected) to remove the violation, when the number of successive crew days exceeds the upper limit value of, for example, 4 days, and the pattern is cut off in a suitable position for the aforementioned base return violation as explained above, is executed.

The processings which are explained in FIG. 20 and FIG. 21 are executed by targeting a daily crew flight scheduling pattern object for one month, then the most suitable evaluation value chromosome is decoded, and a monthly crew flight pattern is created.

FIG. 22 shows a configuration of a computer system used for creating crew flight scheduling patterns. In this figure, the system includes a workstation, operating system, language processing system, construction tools including a GA engine, and applications. GA1 is a GA application for creating a daily crew flight scheduling pattern, and GA2 is a GA application for creating a monthly crew flight scheduling pattern. These applications are the sub-systems which are activated by an application MAIN.

In the above description, the preferred embodiment for creating crew flight scheduling patterns for pilots is explained in detail. It is a matter of course that the present invention can be applied to the crew flight scheduling pattern, not only for an airplane, but also for an electric train and a bus. Further, for calculating the evaluation value for the chromosomes, various kinds of evaluation items which are different from the above described can be used. Still further, the weight value can be set to be various values, and various conditions can be set for the restriction conditions for removing any violations.

Further, the automatic pattern creation method of the present invention is not limited to the above-mentioned crew flight pattern creation, and this method can be applied to any kind of pattern creation if the pattern is a time series pattern in which elements are arranged in time series.

As explained in detail in the above description, the most suitable aircrew flight scheduling pattern can be created as a daily pattern by improving the evaluation of the various evaluation items for the cost and the man-power, for example, evaluation items such as the number of times of exchanging airplanes, and the total number of crew flight scheduling patterns, according to a genetic algorithm. Further, the most suitable monthly crew flight scheduling patterns are created by only combining these daily crew flight scheduling patterns by applying a genetic algorithm. The present invention greatly contributes to the automation of crew scheduling pattern creation.

What is claimed is:

1. An automatic time series pattern creation method for creating a plurality of time series patterns by sequencing elements which should be arranged in time series order, comprising the steps of:

obtaining first time series patterns for a first time span based on contents of an element string with a suitable evaluation value among element strings which are created based on link relations generated by successively linking an element with an earliest starting time to other elements with a starting time later than an end time of the element with the earliest starting time; and creating second time series patterns for a second time span longer than said first time span based on the contents of a string of first time series patterns with a suitable evaluation value among strings of first time series patterns which are created based on link relations generated by successively linking the first time series pattern with an earliest starting time to other first time series patterns with a starting time later than an end time of the first time series pattern with the earliest starting time by using said first time series patterns obtained for said first time span.

2. The automatic time series pattern creation method according to claim 1, wherein a genetic algorithm is applied using the element strings which are used in creating said first time series pattern for said first time span and using said first time series patterns as chromosomes, which are used in creating said second time series patterns for said second time span.

3. The automatic time series pattern creation method according to claim 2, wherein in a process of said genetic algorithm, a one-point crossover between arbitrary elements of said element strings or between said first time series patterns of the string of first time series patterns, and a mutation which targets element strings or said string of first time series patterns created as a result of the one-point crossover, are executed.

4. The automatic time series pattern creation method according to claim 1, wherein said elements are airplane flights, and said first time series patterns and said second time series patterns are crew flight scheduling patterns.

5. The automatic time series pattern creation method according to claim 4, wherein said elements are flights in one day, and a plurality of most suitable daily crew flight scheduling patterns are created for a plurality of air crews as said first time series patterns.

6. The automatic time series pattern creation method according to claim 4, wherein a plurality of most suitable daily crew flight scheduling patterns for a plurality of air crews are created for successive days using all airplane flights in one day as elements as the first time series patterns, and a most suitable crew flight scheduling pattern for said successive days is created as the second time series pattern based on link relations created by successively linking the daily crew flight scheduling patterns for said successive days.

7. The automatic time series pattern creation method according to claim 6, further comprising the steps of:

creating a plurality of daily crew flight scheduling patterns for a plurality of air crews for successive days;

successively linking each of said daily crew flight scheduling patterns starting at an earliest starting time for a first flight pattern to each of connectable daily crew flight patterns starting after an arriving time of a last flight of said daily crew flight scheduling patterns, and creating a plurality of link relations with allowing for including duplicated daily crew flight patterns among different link relations;

designating a position in strings of daily crew flight scheduling patterns in which daily crew flight patterns should be arranged by corresponding to each daily crew flight scheduling pattern at beginning of a link relation for a plurality of said link relations;

creating a plurality of strings of daily crew flight scheduling patterns by allocating each selected daily crew flight scheduling pattern in each corresponding position after each daily crew flight scheduling pattern starting said link relation by selecting each daily crew flight pattern from one or more connectable daily crew flight patterns;

executing predetermined processing after obtaining an evaluation value with a predetermined format for a plurality of strings of said daily crew flight scheduling patterns;

obtaining an evaluation value with said predetermined format for a new string of daily crew flight scheduling pattern created as a result of said predetermined processing; and creating a most suitable crew flight scheduling pattern for said successive days based on contents of a string of daily crew flight scheduling patterns with a best evaluation value.

8. An automatic time series pattern creation apparatus for creating a plurality of time series patterns by sequencing elements which should be arranged in a time series order, comprising:

first time series pattern creation means for creating first time series patterns for a first time span based on contents of an element string with a suitable evaluation value among element strings created based on link relations generated by successively linking an element with an earliest starting time to other elements with a starting time later than an end time of the element with the earliest starting time; and second time series pattern creation means for creating second time series patterns for a second time span longer than said first time span based on contents of a string of first time series patterns with a suitable evaluation value among strings of first time series patterns which are created based on link relations generated by successively linking said first time series patterns with an earliest starting time to other first time series patterns with a starting time later than an end time of the first time series pattern with the earliest starting time by using said first time series patterns created for said first time span.

9. The automatic time series pattern creation apparatus according to claim 8, wherein:

said first time series pattern creation means creates a plurality of most suitable daily crew flight scheduling patterns corresponding to a plurality of air crews as said first time series patterns and by regarding flights in one day as said element; and said second time series pattern creation means creates a most suitable crew flight pattern for successive days as said second time series pattern based on the contents of a string of daily patterns with a suitable evaluation value among strings of daily patterns created based on link relations generated by successively linking daily crew flight scheduling patterns by regarding said daily crew flight scheduling patterns as said first time series patterns.

10. A computer-readable recording medium used to direct a computer to function in a particular manner when used by the computer, comprising the records of:

first time series pattern obtaining procedure for obtaining first time series patterns for a first time span based on contents of an element string with a suitable evaluation value among element strings created based on link relations generated by successively linking an element with an earliest starting time to other elements with a starting time later than an end time of the element with the earliest starting time; and second time series pattern obtaining procedure for obtaining second time series patterns for a second time span longer than said first time span based on contents of a string of the first time series patterns with a suitable evaluation value among strings of first time series patterns created based on link relations generated by successively linking said first time series pattern with an earliest starting time to other first time series patterns with a starting time later than an end time of said first time series pattern with the earliest starting time by using said first time series patterns obtained for said first time span.

11. The computer-readable recording medium according to claim 10, wherein:

said first time series pattern obtaining procedure creates a plurality of most suitable daily crew flight scheduling patterns corresponding to a plurality of air crews as said first time series patterns by regarding flights in one day as elements; and said second time series pattern obtaining procedure creates a most suitable crew flight scheduling pattern for successive days as second time series patterns based on contents of a string of daily crew flight scheduling patterns with a suitable evaluation value among strings of daily crew flight scheduling patterns created based on link relations generated by successively linking said daily crew flight scheduling patterns by regarding said daily crew flight scheduling patterns for successive days as said first time series patterns.

12. An automated scheduling method, comprising:

generating a plurality of first strings each comprising a time-ordered sequence of nonoverlapping event elements selected from a plurality of predetermined event elements each having a specified start time and a specified end time, each of the first strings being selected to generate from a first predetermined evaluation procedure an evaluation value satisfying a first quantitative condition; and generating a plurality of second strings each comprising a time-ordered sequence of nonoverlapping ones of the plurality of first strings, each of the second strings being selected to generate from a second predetermined evaluation procedure an evaluation value satisfying a second quantitative condition.

13. An automated scheduling apparatus, comprising:

means for generating a plurality of first strings each comprising a time-ordered sequence of nonoverlapping event elements selected from a plurality of predetermined event elements each having a specified start time and a specified end time, each of the first strings being selected to generate from a first predetermined evaluation procedure an evaluation value satisfying a first quantitative condition; and means for generating a plurality of second strings each comprising a time-ordered sequence of nonoverlapping ones of the plurality of first strings, each of the second strings being selected to generate from a second predetermined evaluation procedure an evaluation value satisfying a second quantitative condition.

14. A computer-readable medium encoded with a program for automatic scheduling, the program comprising procedures for:

generating a plurality of first strings each comprising a time-ordered sequence of nonoverlapping event elements selected from a plurality of predetermined event elements each having a specified start time and a specified end time, each of the first strings being selected to generate from a first predetermined evaluation procedure an evaluation value satisfying a first quantitative condition; and generating a plurality of second strings each comprising a time-ordered sequence of nonoverlapping ones of the plurality of first strings, each of the second strings being selected to generate from a second predetermined evaluation procedure an evaluation value satisfying a second quantitative condition.

* * * * *